(No Model.)
H. HÜBENER.
PROCESS OF CARBONATING LIQUIDS.
No. 455,102. Patented June 30, 1891.
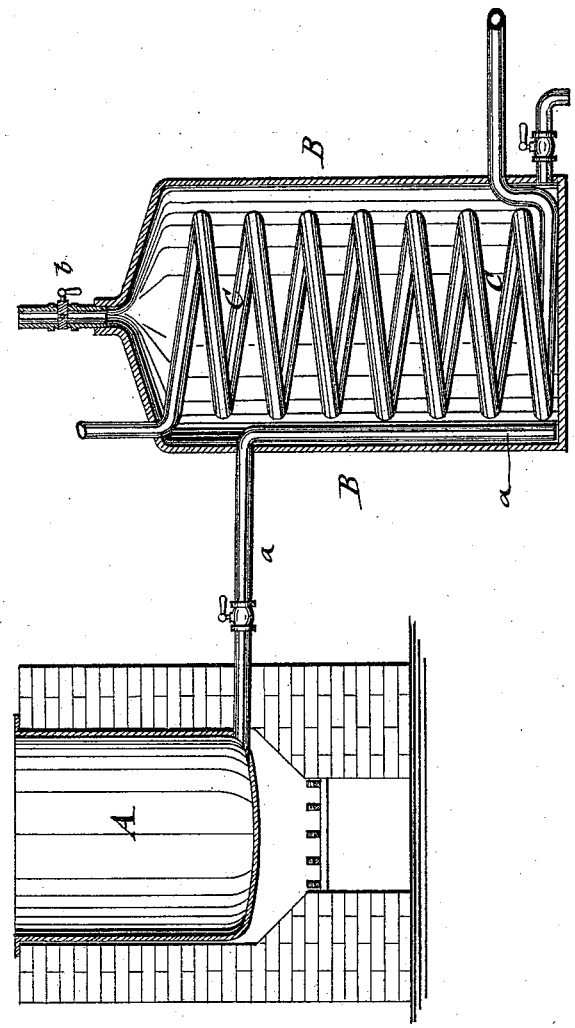
WITNESSES:
INVENTOR
Hermann Hübener
BY
ATTORNEYS.

UNITED STATES PATENT OFFICE.

HERMANN HÜBENER, OF BERLIN, GERMANY.

PROCESS OF CARBONATING LIQUIDS.

SPECIFICATION forming part of Letters Patent No. 455,102, dated June 30, 1891.

Application filed February 18, 1891. Serial No. 381,890. (No specimens.)

*To all whom it may concern:*

Be it known that I, HERMANN HÜBENER, of Berlin, in the Kingdom of Prussia and Empire of Germany, a citizen of the German Empire, have invented certain new and useful Improvements in Processes of Carbonating Liquids, of which the following is a specification.

A careful study of the properties of natural mineral waters and artificial mineral table-waters has led to an improved process of making carbonated waters, by which a table-water is obtained that is unobjectionable from a hygienic and sanitary point and superior in taste and effervescent quality to the effervescent table-waters heretofore known. For this purpose water that is entirely free from atmospheric air is used, which is obtained by subjecting the water after distillation or filtration to a boiling process, then cooling the water in a hermetically-closed vessel containing carbonic acid, and then impregnating the cooled liquid with carbonic acid, permitting it to come in contact with the atmosphere.

The accompanying drawing represents a vertical central section of one form of apparatus by which my improved process of carbonating liquids can be carried out.

When mineral waters are to be impregnated, the required mineral salts in the proper proportions are added to the water and the solution is then subjected to the boiling process for some time, so as to expel thereby all the atmospheric air contained therein. The solution is then drawn off through a pipe *a*, located at the bottom of the vessel A, into a receptacle B, capable of being hermetically closed, which is provided with a vent *b* and filled with carbonic-acid gas, which latter is gradually forced out to the atmosphere in proportion as the hot solution takes its place. The water is then cooled in this closed vessel by means of a cooling-coil C, and is then conducted, without coming in contact with the atmosphere, into the carbonating-machine, in which it is impregnated with carbonic-acid gas under a pressure of two and a half atmospheres, and then drawn into bottles, which are filled in the usual manner with carbonic-acid gas before bottling.

A superior table-water is obtained by mixing with one thousand grams distilled water, free of atmospheric air, 0.73 grams of phosphate of soda, 1.29 grams sulphate of soda, and 0.15 grams of carbonate of lime, which latter forms by reaction with the sulphate of soda a very small quantity of sulphate of lime, which is not objectionable and which is kept in solution by the carbonic acid. It is preferable that distilled water be used, which is then mixed with the mineral ingredients; but as during the condensation of the distilled water the same reabsorbs air in the condenser it has to be boiled for some time, so as to expel all the air contained in the same. To every one thousand grams of distilled water is added the required solution of chemical substances, according to the composition of the natural mineral water that it is desired to produce artificially. The water from which atmospheric air is thus expelled permits the more intimate incorporation of the carbonic-acid gas with the water, so that when the water is decanted from the bottles the gas is not discharged immediately on drawing the cork, but is gradually given off and retained much longer in the water in the same manner as the carbonic-acid gas is retained by the natural mineral waters. Consequently the water is fresher and has a better taste without being immediately flat and non-effervescent.

By the use of the process heretofore described artificial mineral waters can be produced which are fully equal to the natural mineral waters as regards the quantity and admixture of carbonic acid in the same, it being in other respects even superior to the natural waters, for the reason that a uniform quantity of carbonic-acid gas can be incorporated in the same, which is not the case with the natural mineral waters bottled at the springs, as the quantity of carbonic acid contained is subject to considerable variations.

Having thus described my invention, I claim as new and desire to secure by Letters Patent—

1. The process herein described of carbonating liquids, which consists in subjecting the liquid to a boiling process, so as to expel the atmospheric air contained in the same, then drawing the hot liquid under exclusion of air into a closed vessel containing carbonic-acid gas and permitting the liquid to cool in said vessel, and then impregnating the cooled solution with carbonic-acid gas, substantially as set forth.

2. The process herein described of carbonating liquids, which consists in dissolving the mineral salts in proper proportions in the water, next subjecting the solution to a boiling process, so as to expel the atmospheric air contained in the same, next drawing off the solution into a closed vessel containing carbonic acid and permitting it to cool in said vessel, and lastly impregnating the cooled solution with carbonic acid, substantially as set forth.

In testimony that I claim the foregoing as my invention I have signed my name in presence of two subscribing witnesses.

HERMANN HÜBENER.

Witnesses:
RICHARD SCHURICHT,
    22 *Michaelkirchplatz, Berlin.*
GUSTAV PREUSSING,
    17 *Prinzessinnen Strasse, Berlin.*